Nov. 5, 1935.  H. C. STEPHENS ET AL  2,020,250
CASCADE DEAERATOR
Filed July 29, 1932
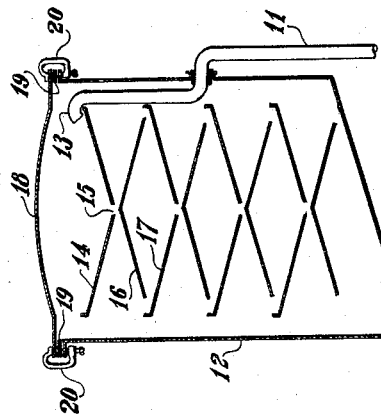
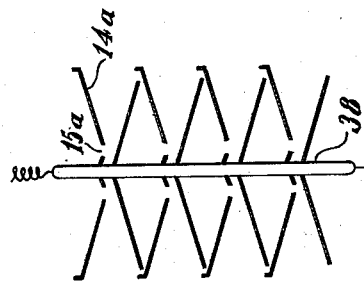
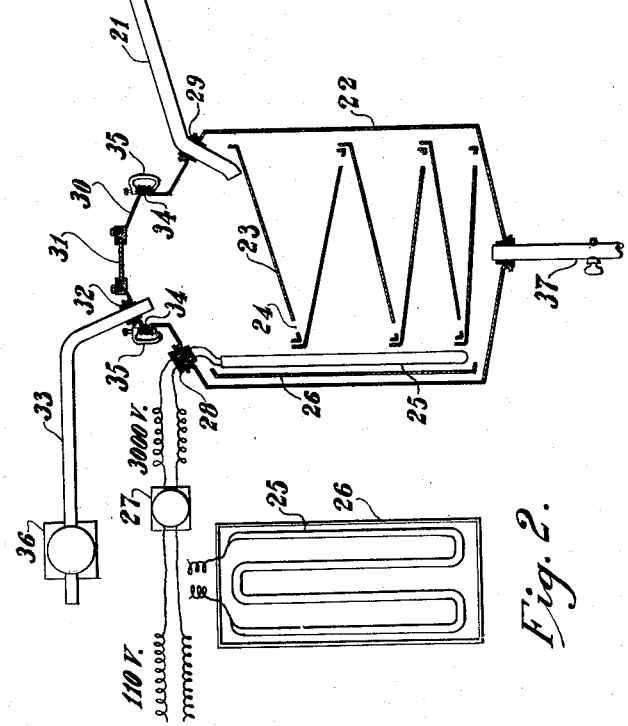
Fig. 3.
Fig. 1.
Fig. 2.
Stedman B. Hoar
Henry C. Stephens
INVENTORS.
BY Roger Sherman Hoar
ATTORNEY.

Patented Nov. 5, 1935

2,020,250

UNITED STATES PATENT OFFICE 2,020,250

CASCADE DEAERATOR

Henry C. Stephens, Ontario, and Stedman B. Hoar, Claremont, Calif., assignors, by mesne assignments, to Natural Food Products Company, a corporation of Delaware Application July 29, 1932, Serial No. 626,240

4 Claims. (Cl. 99—2)

Our invention relates to new and useful improvements in method and means for deaerating liquid food products.

In devising and developing our process for treating and packing liquid food products, we early discovered that the suction of even a high vacuum is insufficient to remove the dissolved and occluded air from more than a few millimeters below the surface exposed to the vacuum. Accordingly it becomes necessary to so comminute and/or agitate and/or spread the liquid that every part of it shall receive surface exposure to a high vacuum.

Accordingly it is the principal object of the present invention to provide the most ideal and efficient apparatus and process for accomplishing this surface exposure.

Also we have found that the advantages of ultra-violet irradiation in vacuo are to some extent offset by the creation of ozone odors in some processed liquid, if there is still present in the liquid any oxygen at the time of irradiation. Not only does the presence of the ozone thus created impart a lasting bad flavor to certain liquid food products, which flavor is practically impossible to eliminate even by the subsequent removal of the ozone, but it also has a tendency to render the rarefied air in the deaerator less pervious to the ultra-violet rays, and thus retard their beneficial effect on the liquid.

Accordingly it is a further principal object of our invention to provide for at least a considerable portion of deaeration before irradiation, and in other respects to irradiate the liquid at such time and when it is in such condition as to derive the maximum good therefrom.

In addition to our principal objects, we have worked out a number of novel and useful details, which will be readily evident as the description progresses.

Our invention consists in the novel steps, and in the novel parts, and in the combinations and arrangements thereof which are defined in the appended claims. Two embodiments of our apparatus, which can be combined to constitute a third embodiment, are exemplified in the accompanying drawing, which is hereinafter particularly described and explained.

Throughout the description, the same reference number is applied to the same member or to similar members.

Figure 1 is a vertical section of an apparatus using both types of our cascade deaerator.

Figure 2 is an elevation of the lamp and mirror of Figure 1, as viewed from the right in that figure.

Figure 3 is a variant of the cones of the upper right hand deaerator of Figure 1, showing the addition of an ultra-violet lamp.

Referring to the drawing, and beginning in the upper right hand corner of Figure 1, we see that 11 is a pipe which leads the liquid from a source (not shown) into deaerating tank 12, through spray nozzle 13.

The liquid falls into an inverted aluminum cone 14. The liquid falls through a hole 15 at the apex of this cone, onto the apex of erect cone 16. It falls from the outside edge of this cone into inverted cone 17, and so on through an alternate series of inverted and erect cones until it reaches the bottom of the tank.

The tank is sealed by a cover 18 and gasket 19, by means of clamps 20.

From the bottom of tank 12, the now-deaerated liquid runs through a combined vacuum and liquid line 21 into the top of tank 22, where it falls onto the uppermost of a series of inclined aluminum vanes 23. It slides in a thin film successively down the upper surfaces of these vanes, dropping through holes 24 near the bottom of each vane onto the top of the succeeding vane. The top, bottom and side edges of each vane are turned up, so that the vane resembles a square cake tin with a row of holes along one side of the bottom.

The use of the combined vacuum and liquid line 21 has certain advantages, but is not essential. Two separate lines may be used.

Within the tank there is also an ultra-violet lamp 25 and its reflector 26. These are shown edgewise in Figure 1, but are shown in Figure 2 as viewed from the right in Figure 1. The mirror 35 is preferably of sheet aluminum, coated with aluminum oxide. Ultra-violet rays of short hard wavelength, thus reflected, have the power to penetrate the cascading film of liquid, even though a considerable vacuum distance separates the lamp from the liquid. This light treatment adds vitamin D to the liquid, and also greatly increases its shelf life.

The lamp uses ordinary electric current from a lamp socket, after being stepped up to 3000 volts by a transformer 27. The wires enter the tank through a rubber stopple 28. The entrance of pipe 21 is similarly protected by a rubber stopple 29.

The cover 30 to the tank 22 is fitted with a glass window 31, and a rubber stopple 32 for the entrance of exhaust pipe 33. The cover is secured to the tank with a gasket 34 and clamps 35.

A vacuum pump 36, preferably a motor driven

Kinney pump capable of exhausting to an absolute pressure as low as 1″ Hg. and preferably ½″ Hg. or less, serves to exhaust both tanks.

The deaerated and irradiated liquid gathers in the bottom of tank 22, and is drawn off as desired, through pipe 37.

Although we show the successive use of two deaerators, deaeration of certain liquid food products can be quite satisfactorily accomplished by the use of either one of our deaerators alone. But in such a case the following slight changes should be observed.

If tank 12 alone be used, means should be provided for the entry of exhaust pipe 33, as shown in Figure 1 in connection with tank 22. Pipe 21 will serve to carry away the deaerated liquid. If it is desired to irradiate the liquid during deaeration in tank 12, the variant shown in Figure 3 may well be employed.

There it will be noted that a single straight ultra-violet lamp 38 runs along the axis of the cones. To prevent the liquid which gathers in the inverted cones 14a from touching the lamp, the apex 39 is reverted as shown, and a ring of holes 15a is substituted for the apex-hole 16.

If tank 22 alone be used, pipe 11 may enter at the place where pipe 21 is now shown as entering, and still have its spray nozzle 13. Also it now becomes important that the vanes 23 be rather steeply inclined at the top of the tank, becoming less and less inclined as we approach the bottom of the tank.

Through a glass window in the side of an experimental deaerator of this type, we have observed what takes place, as follows: The liquid explodes as it enters through nozzle 13, and slides down the first vane in a lather as thick as heavy shaving soap lather. Dropping through the holes at the foot of the vane smashes some of the bubbles, and causes new ones to form by turning the lather over. About half way down the series of vanes, the lather has become consolidated into liquid again, and by the time that the liquid reaches the bottom it is clear liquid, free of bubbles.

The object of the greater inclination of the upper vanes is to permit free flow of the lather. The object of the lesser inclination of the lower vanes is to cause the liquid to form a thin slow-flowing film.

Having now described and illustrated three forms of our invention, we wish it to be understood that our invention is not to be limited to the specific forms or arrangements of parts hereinbefore described, except in so far as such limitations are specified in the appended claims.

We claim:

1. In a deaerator for liquid food products, the combination of: a vacuum chamber; means to exhaust the air therefrom to a pressure sufficiently low to accomplish complete degasification of the liquid; means to introduce the liquid near the top thereof; a series of inclined vanes within the chamber, some of the vanes having one or more holes near their bottoms, opening above the tops of succeeding vanes; the vanes being less and less steeply inclined in downward succession; means to withdraw the liquid from the bottom of the chamber; and an ultra violet lamp, backed by a reflector, within the chamber.

2. In a deaerator for liquid food products, the combination of: a vacuum chamber; means to exhaust the air therefrom to a pressure sufficiently low to accomplish complete degasification of the liquid; means to introduce the liquid near the top thereof; a series of inclined vanes within the chamber, at least some of the vanes having one or more holes near their bottoms, opening above the tops of succeeding vanes; the vanes being less and less steeply inclined in downward succession; and means to withdraw the liquid from the bottom of the chamber 3. In a deaerator for liquid food products, the combination of: a vacuum chamber; means to exhaust the air therefrom to a pressure sufficiently low to accomplish complete degasification of the liquid; means to introduce the liquid near the top thereof; a series of inclined vanes within the chamber; the vanes being less and less steeply inclined in downward succession; means to withdraw the liquid from the bottom of the chamber; and an ultra violet-lamp, backed by a reflector, within the chamber.

4. In a deaerator for liquid food products, the combination of: a vacuum chamber; means to exhaust the air therefrom to a pressure sufficiently low to accomplish complete degasification of the liquid; means to introduce the liquid near the top thereof; a series of inclined vanes within the chamber; the vanes being less and less steeply inclined in downward succession; and means to withdraw the liquid from the bottom of the chamber.

HENRY C. STEPHENS.
STEDMAN B. HOAR.